United States Patent [19]
Ota et al.

[11] Patent Number: 4,987,426
[45] Date of Patent: Jan. 22, 1991

[54] LASER IRRADIATING APPARATUS AND LASER RECORDING APPARATUS USING THE SAME

[75] Inventors: Shinichi Ota; Keiichi Kawasaki, both of Tokyo, Japan

[73] Assignee: Canon Kabushiki Kaisha, Tokyo, Japan

[21] Appl. No.: 404,219

[22] Filed: Sep. 7, 1989

[30] Foreign Application Priority Data

Sep. 14, 1988 [JP] Japan ................... 63-230918

[51] Int. Cl.$^5$ .................... H04N 1/25; H01S 3/10
[52] U.S. Cl. .................... 346/108; 372/26; 372/95
[58] Field of Search ............ 346/108, 107 R, 76 C, 346/160; 372/26, 31, 32, 95

[56] References Cited

U.S. PATENT DOCUMENTS 4,679,057 7/1987 Hamada .................. 346/76 L
4,814,791 3/1989 Ohara et al. .............. 346/108

FOREIGN PATENT DOCUMENTS 61-124921 6/1986 Japan .
63-102552 5/1988 Japan .

Primary Examiner—Mark J. Reinhart
Attorney, Agent, or Firm—Fitzpatrick, Cella, Harper & Scinto

[57] ABSTRACT

The present invention provides a laser irradiating apparatus which comprises a laser which can be directly modulated by a modulation signal, and in which laser oscillation becomes unstable when the intensity of the modulation signal is smaller than a predetermined threshold value, and laser oscillation becomes stable when the intensity of the modulation signal is larger than the predetermined threshold value, means for comparing the intensity of the modulation signal with a predetermined value near the predetermined threshold value, and means for modulating an emission time of the laser when the intensity of the modulation signal is smaller than the predetermined value.

15 Claims, 10 Drawing Sheets

LASER IRRADIATING APPARATUS AND LASER RECORDING APPARATUS USING THE SAME

BACKGROUND OF THE INVENTION

1. Field of the Invention

This invention relates to a laser recording apparatus and a laser irradiating apparatus for performing optical scanning on an object, such as a silver-salt film and the like, for example, using a light output of a semiconductor laser, to record a half-tone image.

2. Description of the Related Art

Heretofore, in an image recording apparatus used, for example, in medical treatment for recording a half-tone image on a silver-salt film and the like, a gas laser, such as a He-Ne laser and the like, has been used for a laser light source. Since a light output of a gas laser can not be directly modulated, however, it is necessary to provide a separate light modulator, such as an acoustooptic modulator (AOM) and the like. Recently, however, an inexpensive semiconductor laser (a laser diode) has found widespread use, primarily because the gas laser and the AOM are expensive.

The semiconductor laser has the advantage that its light output can be directly modulated by modulating its driving current, and a separate light modulator such as the AOM is not required. However, the limited dynamic range of the semiconductor laser causes its own problems.

FIG. 4 illustrates the relationship between the driving current and the light output of the semiconductor laser. The semiconductor laser produces an LED emission without producing a laser emission when the driving current is from zero up to the threshosld current $I_{TH}$, and finally produces a laser emission when the driving current exceeds $I_{TH}$. The relationship between the driving current and the light output of the semiconductor laser shows a nearly linear characteristic at each of the LED emission area and the laser emission area, but the slope of each region is very different from each other. The relationship also has a sharp inflection point at $I_{TH}$. The ratio of $P_{MAX}$ to $P_{TH}$ is at most between 10 and 100 to 1, where $P_{TH}$ is the light output at $I_{TH}$. Hence, there is the problem that, when an image is recorded on a silver-salt film when the semiconductor laser is operating in the laser emission area, that is, from $P_{TH}$ to $P_{MAX}$, a desired density range sometimes can not be obtained.

This fact will be explained with reference to FIG. 5(A). The first quadrant I of FIG. 5(A) shows the input characteristic of a recorded image, where the abscissa represents the input signal I and the ordinate represents the recorded density D. In this case, it is assumed that the driving current of the semiconductor laser is proportional to the input signal. Hence, the input signal is equivalent to the driving current. The driving current, that is, the input signal, is converted into a light output P by the characteristic of the semiconductor laser shown in the fourth quadrant IV, where the ordinate represents the light output P. The amount of exposure E is a product of the light output P and an exposure time T, and becomes $$E = T \times P \quad (1)$$
$$= T_0 \times P \quad (2)$$

if the exposure time T has a constant value $T_O$. Hence, E and P are equivalent to each other.

The amount of exposure E is converted into the recorded density by the relationship between the amount of exposure and the recorded density, the so-called HD curve shown in the second quadrant II. Since density is defined by the logarithm having the base 10 of transmittance or reflectivity, the amount of exposure E is also usually expressed by the logarithm having the base 10. Accordingly, a logarithmic transformation having the base 10 is performed at the third quadrant III. If the abscissa of the second quadrant is represented by a normal scale, rather than by logarithm, the diagram of the logarithmic transformation in the third quadrant becomes unnecessary.

As is apparent from the above-described explanation, since no operation is performed relative to the signal, the characteristic shown in the first quadrant becomes a composite characteristic itself of the characteristic of the semiconductor laser and the characteristic of the silver-salt film.

A graph such as that shown in FIG. 5(A) may be used to determine the image density D that will result from a given input I. To use the graph, an input I is selected and a resulting laser power P is determined in quadrant IV. Since the power P is equivalent to the amount of exposure E, the logarithm to base 10 is next determined in quadrant III. Finally, the image density D is determined from the HD curve in quadrant II.

By repeating this cycle through quadrants IV, III and II for a number of different input powers I, the composite characteristic shown in quadrant I, which directly shows the input density D as a function of input power I, may be constructed. For example, for input power $I_{TH}$, quadrant III gives the logarithm to base 10 of exposure as shown by the solid line. Using curve (b) in quadrant II gives the density for this exposure as $D_F$. Thus, reverting back to quadrant I, a point may be placed at the intersection of both $D_F$ and $I_{TH}$ to indicate directly that for input power $I_{TH}$, a density $D_F$ will result when curve (b) in quadrant II is used.

If it is assumed that the HD curve of the silver-salt film has a characteristic having a very narrow latitude as shown by (a) in the second quadrant, recording can be performed from the base density $D_B$ of the silver-salt film at a desired laser emission area up to the maximum density $D_{MAX}$, as shown by (a) in the first quadrant. However, since the latitude of a normal silver-salt film is at least between 100 and 1000 to 1, the characteristic as shown by (b) in the second quadrant is obtained. In this case, the recorded characteristic becomes as shown by (b) in the first quadrant, and if it is assumed that the driving current of the semiconductor laser is used only down to $I_{TH}$, a fog having a density of $D_F$ is produced. The curve (b) is for the case of adjusting to the maximum density $D_{MAX}$. If the amount of exposure is decreased using a low-power semiconductor laser or an optical filter so that a fog is not produced, the curve (b) in the second quadrant is shifted to the left to become the curve (c). In this case, although a fog is not produced, the maximum density obtained decreases from $D_{MAX}$ to $D_M$, and the desired density range can not be obtained.

As a conventional example for dealing with the above-described disadvantage, there is Japanese Patent Public Disclosure (Kokai) No. 63-102552 (1988). This is a method in which the total area of the LED emission area and the laser emission area of a semiconductor laser is used, and a look-up table is used for correcting its nonlinear property, like general nonlinear correction.

A characteristic obtained by this method is shown in FIG. 5(B). The first quadrant in FIG. 5(B) corresponds to the first quadrant in FIG. 5(A). In this case, however, the abscissa represents the input signal N, because the input signal is converted into driving current after having been corrected by the look-up table. The second quadrant shows a composit characteristic of the characteristic of the semiconductor laser and the characteristic of a silver-salt film, and is identical to that shown by (b) in the first quadrant in FIG. 5(A). The third quadrant shows a correction characteristic. In this example, it becomes a characteristic which is symmetrical to that of the second quadrant, because the first quadrant has a linear characteristic. This transformation process is described in detail, for example, in Japanese Patent Public Disclosure (Kokai) No. 61-81075 (1986), and a detailed explanation thereof will be omitted.

It is very difficult and therefore impractical to perform the correction in the third quadrant by an analog circuit, and a look-up table of a digital circuit is generally used. Since the output of the look-up table is proportional to the driving current of the semiconductor laser, they are equivalent to each other, and transformation thereof is omitted. In the present conventional example, since the driving current of the semiconductor laser is used from zero to $I_{MAX}$ and the light output can be used from zero to $P_{MAX}$, it is possible to scan a silver-salt film which has a large latitude. In this example, however, since the non-linear characteristic to be corrected has a steep slope and a sharp inflection point, and is corrected by the look-up table of the digital circuit, there occur various inconveniences. An amount less than 1 bit can not be expressed by the digital circuit, and the density difference which can be expressed is limited by the output of the look-up table, that is, 1 LSB on the I axis and becomes $\Delta D$, as shown in FIG. 5(B). $\Delta D$ is proportional to the slope of the characteristic of the second quadrant. When $\Delta D$ is large, a so-called pseudo-contour appears in a recorded image. In order to suppress $\Delta D$ to a small value, the number of bits of the look-up table must be large. Furthermore, as described above, there is a sharp inflection point in the characteristic, and gradation distortion appears in a recorded image if the the inflection point is exactly corrected. However, it is actually difficult to exactly correct the sharp inflection point.

As another conventional example, there is Japanese Patent Public Disclosure (Kokai) No. 61-124921 (1986) (U.S. Pat. No. 4,679,057). This is a method in which a limited number of light outputs are utilized within the laser emission area of a semiconductor laser and the amount of exposure is changed by performing pulse-width modulation of the light outputs to broaden dynamic range, somewhat like a multivalued dither method. This method is based on the reciprocity law that density is determined by the amount of exposure which is the product of light intensity and exposure time. That is, in the above-described formula (1), density is constant if E is constant, whether P is changed while keeping T constant, or T is changed while keeping P constant. Accordingly, in the present conventional example, the dynamic range of the amount of exposure becomes large while leaving the dynamic range of the light output of the semiconductor laser narrow, and the relationship between the input signal and the amount of exposure can also have a nearly linear characteristic. This example has, however, the following problems.

FIG. 7 shows distributions of the amount of exposure when optical scanning is performed with turning on and off a laser light. In FIGS. 7(A), 7(B) and 7(C), the symbol a indicates the intensity distribution of the laser light, which nearly shows a Gaussian distribution. The symbol b indicates the control signal of the laser light, and the abscissa represents the time axis. When the laser light is scanned at a constant speed $V_O$, distance L becomes $$L = V_O T \qquad (3),$$

and L and T are equivalent to each other. The symbol c indicates the distribution of the amount of exposure, which is the superposition integral of a and b, the process of which is concretely described in, for example, Japanese Patent Public Disclosure (Kokai) No. 62-104268. FIG. 7(A) is a case in which the semiconductor laser is set at the maximum light output, and turning-on for one picture element and turning-off for one picture element are repeated. The shape of the distribution c of the amount of exposure differs according to the beam diameter of the laser light, but the on-portion and the off-portion are always symmetrical to each other and the duty ratio is 1:1. That is, the ratio of the line width of a high-density portion to that of a low-density portion of a recorded image is one. FIG. 7(B) shows a case of an analog modulation in which the light output of the semiconductor laser is decreased and turning-on for one picture element and turning-off for one picture element are repeated like in the case of FIG. 7(A), and illustrates a case in which the amount of exposure is made one fourth by making the light output about one fourth of that in the case of FIG. 7(A). Also in this case, the on-portion and the off-portion in c are symmetrical to each other and duty ratio is 1:1. That is, as can be understood from the example in FIG. 7(B), when the light output is changed keeping the duty ratio of the on-off control of the semiconductor laser at 1:1, the duty ratio of the distribution of the amount of exposure is also kept at 1:1. This is, if contrast of a recorded image is changed, the ratio of the line width of a high-density portion to that of a low-density portion is kept at one. This is a desirable characteristic. However, as shown in FIG. 7(C), in the case of a pulse-width modulation in which the amount of exposure is made one fourth by making the turned-on time of the laser one fourth like b with leaving the light output of the semiconductor laser at the maximum value like a, the on-portion and the off-portion become unsymmetrical as shown by c, and the on-portion becomes shorter and the off-portion becomes longer. Accordingly, if contrast is decreased through pulse with modulation control by this conventional example for a silver-salt negative film, there occurs the disadvantage that the width of the on-portion becomes narrower and black lines become thinner. Since pulse-width modulation is performed at a high light output in the conventional cases, this phenomenon manifests itself quite clearly. Hence, it has been impossible to obtain an excellent image.

As explained above, in the conventional example in which the total emission area of the LED emission and the laser emission of a semiconductor laser is corrected, there is the disadvantage that it is actually difficult to correct its extremely nonlinear characteristic. In another conventional example in which a multivalued pulse-width modulation is performed in the laser emission area, there is the disadvantage that variations in the recorded line width are manifested due to the contrast of a recorded image, and give a bad influence on the quality of a picture.

SUMMARY OF THE INVENTION

It is an object of the present invention to increase the number of gradation in a laser recording apparatus for recording an image having many gradations by intensity modulation of a semiconductor laser.

It is a further object of the present invention to widen dynamic range in semiconductor-laser modulation by making an unstable operating area (an LED area) of a semiconductor laser, which could not have previously been used, usable.

It is a still further object of the present invention to provide a laser recording apparatus in which a good-quality image can be obtained using a triangle wave while performing pulse-width modulation.

It is still another object of the present invention to provide a laser recording apparatus in which a good-quality image can be obtained by performing plural times of pulse-width modulations for one picture element while performing pulse-width modulation.

It is still a further object of the present invention to provide an apparatus which can constitute a look-up table for correcting nonlinear characteristics of a semiconductor laser and a silver-salt film with a small number of bits.

BRIEF DESCRIPTION OF THE DRAWINGS

FIGS. 2(a) through 2(g), shows diagrams of signal waveforms of the embodiment in FIG. 1;

FIGS. 3(a) through 3(g), shows diagrams of signal waveforms in another embodiment;

DETAILED DESCRIPTION OF THE PREFERRED EMBODIMENTS

Figure 1:
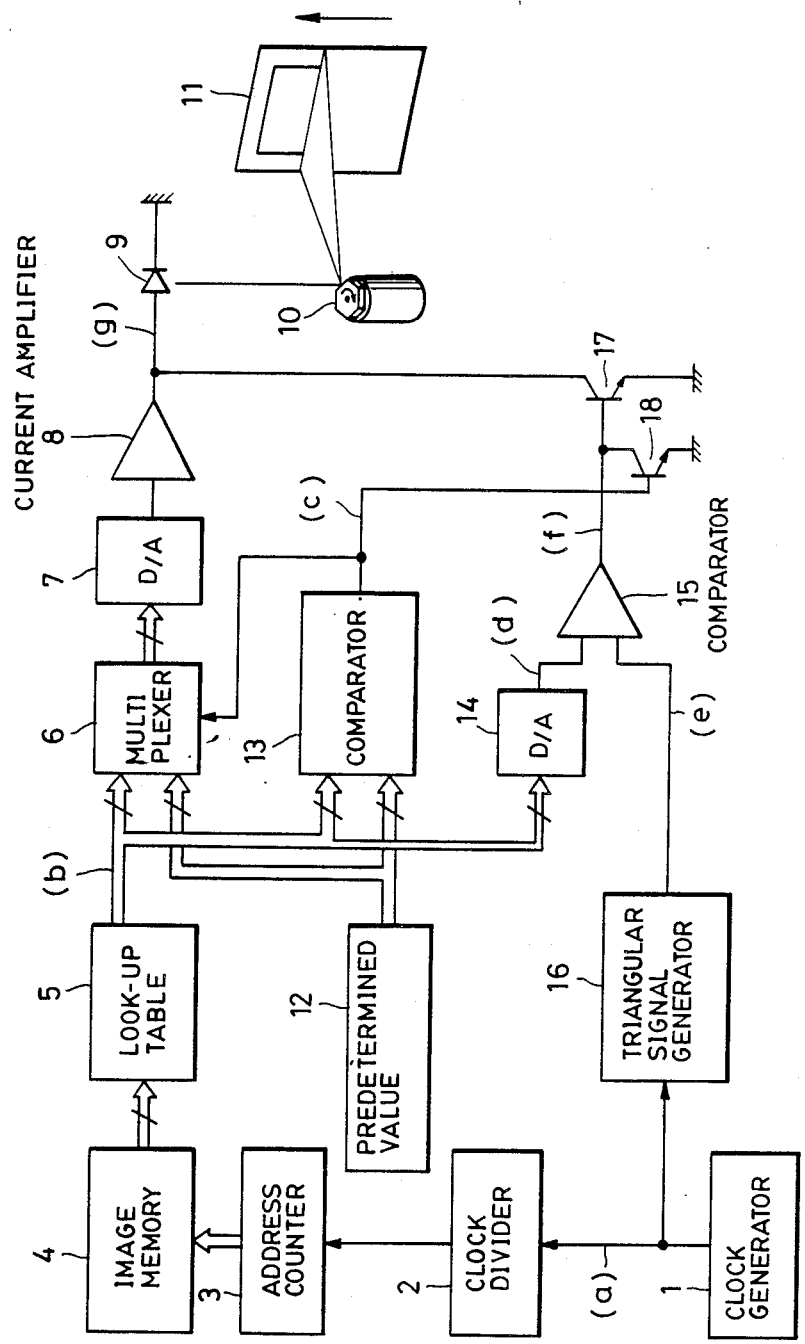
FIG. 1 is a block diagram of an embodiment of the present invention.

FIG. 1 shows an embodiment of the present invention. In FIG. 1, an output of a clock generator 1 is frequency-divided by a clock divider 2, and drives an address counter 3. Image data have been recorded in an image memory 4 by a separate means (not illustrated), and image data in an address assigned by the address counter 3 are output at image recording. In the present embodiment, image data are constituted by 12 bits, and have values 0–4095. Image data read from the image memory 4 are converted by a look-up table 5 and input to a multiplexer 6. Data conversion by the look-up table 5 will be described later. When image data are larger than a predetermined value, the multiplexer 6 selects image data to be input and outputs the data by an operation which will be described later. The data are then converted into an analog signal by a D/A converter 7, and the analog signal becomes a current signal at a current amplifier 8 to drive a semiconductor laser 9. A light output from the semiconductor laser 9 performs main scanning on a silver-salt film 11 by a rotating polygon mirror 10 via an optical system (not illustrated). The silver-salt film 11 is moved relatively in the direction of the arrow in FIG. 1 by another driving system (not illustrated) to be subjected to subscanning. The laser light performs raster scanning on the silver-salt film 11 to form a latent image.

A synchronizing signal for each scanning by the rotating polygon mirror 10 is usually detected by a photodetector (not illustrated), and controls the address counter 3. Furthermore, since the light output of the semiconductor laser varies due to temperature, an automatic power control (APC) circuit for performing feedback of a signal of the photodetector, which receives the light output, to driving current is usually used, but the diagram of the circuit is omitted in the present embodiment.

Figure 4:
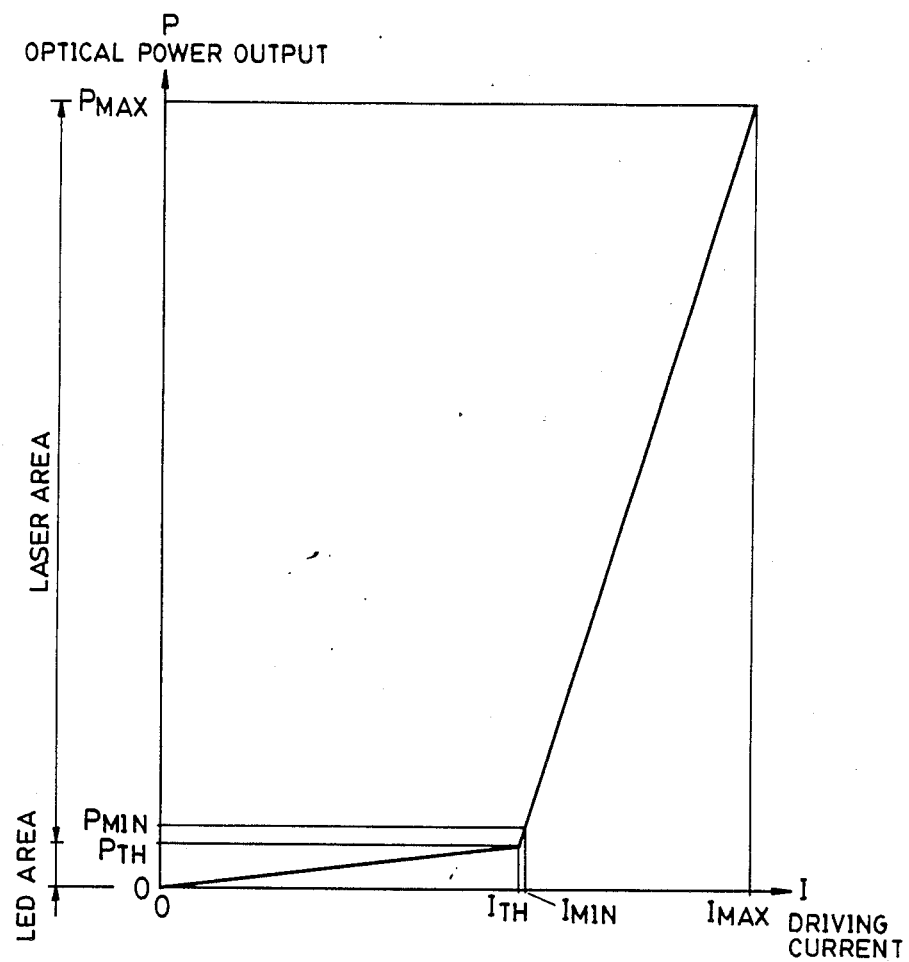
FIG. 4 is a characteristic diagram between driving current and light output of a semiconductor laser.

A predetermined value 12 as a digital value set in accordance with the characteristic of the semiconductor laser to be used connects the level of the digital signal to a power supply or the ground. It is also possible to make the predetermined value 12 variable using a variable switch. In the present invention, the predetermined value is set at 255. This value is one 16-th of the maximum value of image data, and the driving current of the semiconductor laser on this occasion is $I_{MIN}$ in FIG. 4 and the light output is $P_{MIN}$ in the laser emission area. The predetermined value 12 is not limited to 255, but it may have any value provided that the light output $P_{MIN}$ at the driving current $I_{MIN}$ is within the laser emission area. It is preferable, however, that $P_{MIN}$ is near the threshold value $P_{TH}$. In the present embodiment, $P_{MIN}$ is one 16-th of $P_{MAX}$. On the other hand, since $I_{MIN}$ is much larger than one 16-th of $I_{MAX}$, it is arranged to flow a biasing current in the current amplifier 8 so that the current becomes $I_{MIN}$ when the input of the D/A converter is 255. A digital comparator 13 compares the output of the look-up table 5 with the predetermined value 12, and outputs a high-level signal when the output of the look-up table 5 is larger than the predetermined value 12, that is 255. This output controls output selection of the multiplexer 6, and outputs the input from the look-up table 5 in the case of a high level. On the contrary, when the output of the look-up table 5 is not more than the predetermined value 12, that is, not more than 255, the digital comparator 13 outputs a low level, and the multiplexer 6 outputs 255 which is the predetermined value. Accordingly, if image data after having been converted by the look-up table 5 are not more than 255, the driving current of the semiconductor laser 9 always becomes the constant value $I_{MIN}$. Among outputs of the look-up table 5. The lower 8 bits of the output of look-up table 5 are input to a comparator 15 after having become an analog signal by a D/A converter 14, and compared with an output of a triangular signal generator 16 forming a triangular wave in synchronization with an output of the clock generator 1. When the output of the triangular signal generator 16 is larger than the output of the D/A converter 14, the output of the comparator becomes a high level, and turns on a switching device 17, such as a transistor and the like. When the transistor 17 is turned on, the driving current of the semiconductor laser 9 becomes zero.

However, the value of lower 8 bits for the D/A converter 14 is sometimes smaller than 255, even when image data after conversion are larger than 255. Hence, the output of the digital comparator 13 controls a switching device 18, such as a transistor and the like, and turns on the transistor 18 to prevent that the transistor 17 is turned on, when the converted image data are larger than 255.

Figure 2:
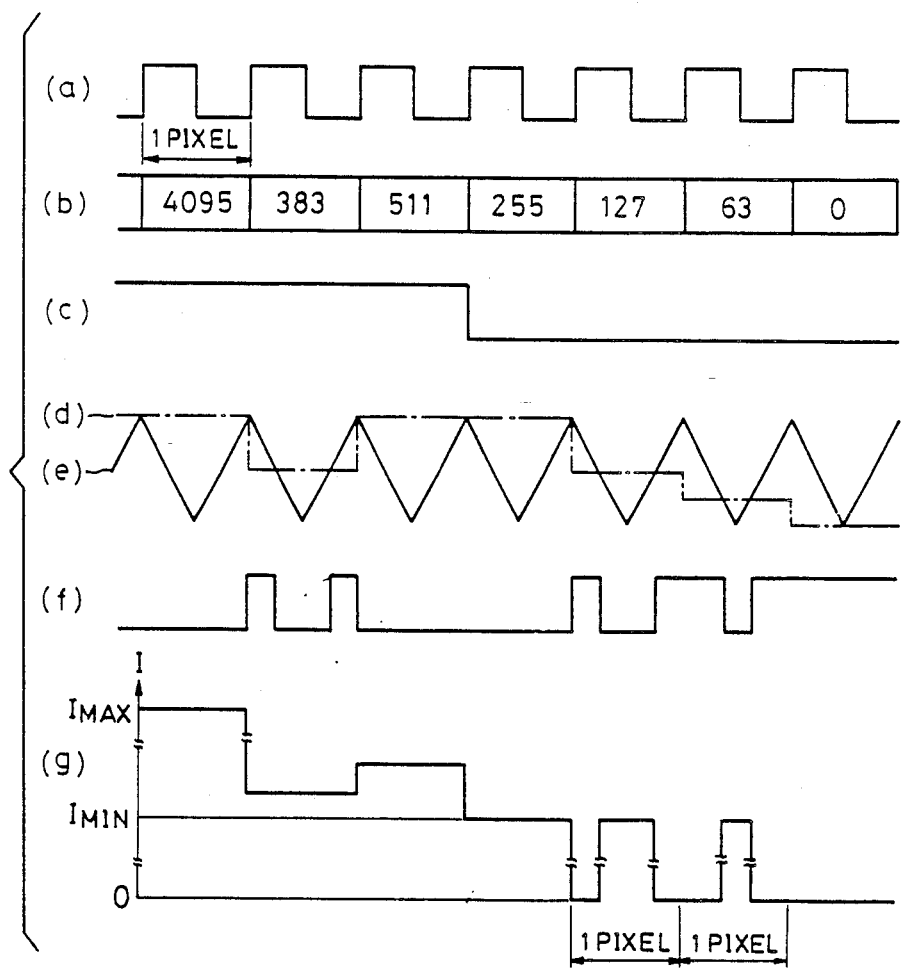
FIG. 2, comprising

An example of signals thus controlled is shown in FIG. 2. Signals in FIGS. 2(a)-2(g) correspond to signals indicated at (a)-(g) in FIG. 1, respectively. In the present embodiment, there is shown a case in which the frequency dividing ratio of the clock divider 2 shown in FIG. 1 is 1, that is, an example in which no frequency division is performed, and the period of image data which are read is equal to the period of the triangle wave. FIG. 2(b) shows the value of image data after conversion. For example, when the value is 383, since lower 8 bits are smaller than 255, the signal (f) partially becomes at a high level, but the signal (c) is at a high level. Hence, the transistor 18 is turned on, but the transistor 17 is not turned on, and the driving current (g) of the semiconductor laser 9 is not subjected to pulse-width modulation.

While performing pulse-width modulation, if a sawtooth wave is used instead of the triangular wave as a comparison signal, pulse-width modulation is performed from the left end or the right end of one picture element by a width in accordance with the density of the picture element. In this case, there is the problem that, when drawing a straight line in the subscanning direction, if the density of each picture element on the line is different from one another, the center of each picture element is shifted according to the density, and the drawn straight line does not appear as a straight line. On the contrary, when a triangular wave is used as in the present invention, since modulation is performed so that the pulse width is broadened from the central portion of one picture element, the center of each picture element is always lined up even if the densities of picture elements on the line change when drawing a straight line in the subscanning direction, and an excellent straight line can be obtained. Consequently, an image having better quality can be obtained compared with the case of using a sawtooth wave.

Thus, when image data after having been converted by the look-up table 5 are larger than 255, the driving current of the semiconductor laser 9 is subjected to analog modulation, and when the image data are not more than 255, pulse-width modulation is performed with keeping the driving current at a constant value. The pulse width is proportional to the data value 0-255, and it is apparent from the above-described formula (1), the data value is proportional to the amount of exposure.

Figure 5:
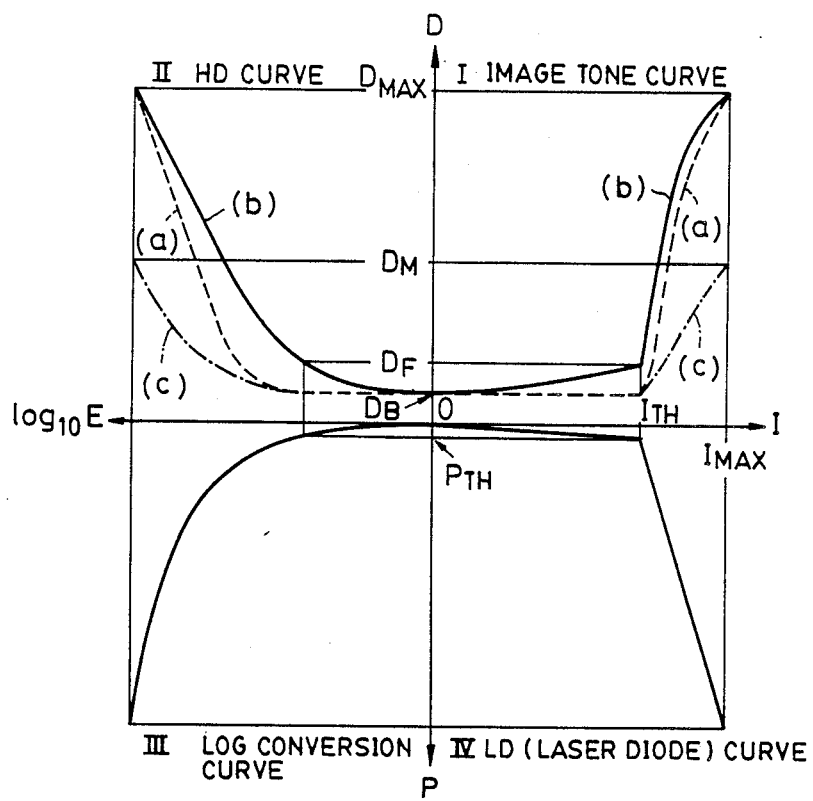
FIG. 5, composed of FIGS. 5(A) and 5(B), shows characteristic diagrams of recorded images in conventional examples.
Figure 5:
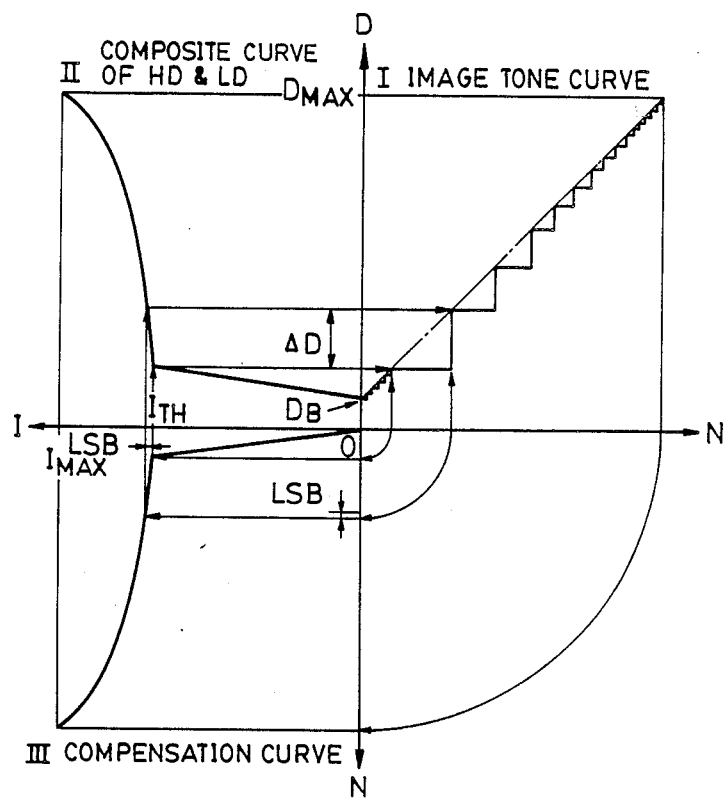
Figure 6:
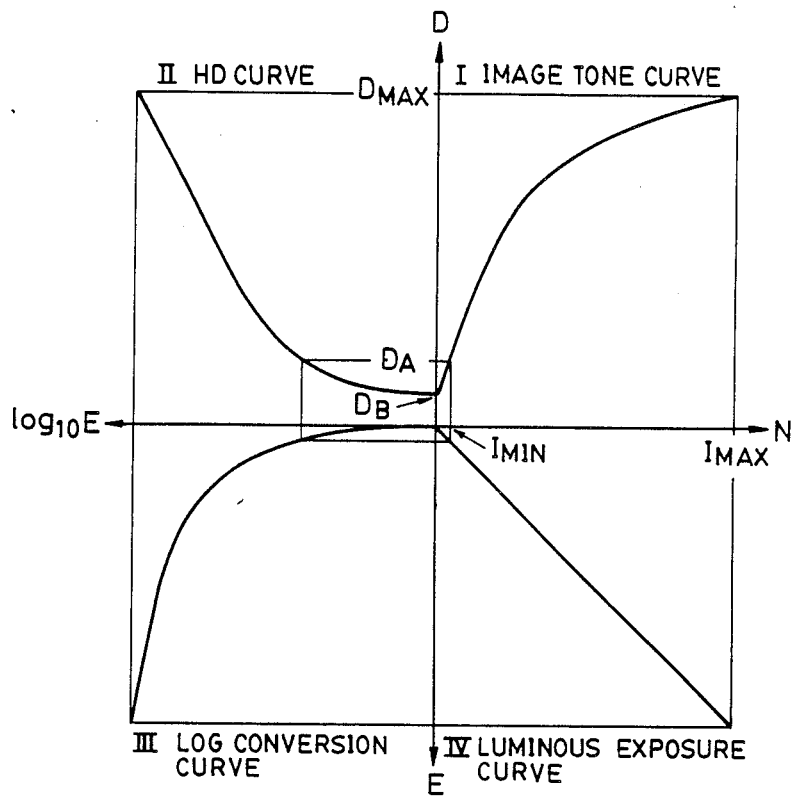
FIG. 6, composed of FIGS. 6(A) and 6(B), is characteristic diagrams of recorded images according to the present invention.
Figure 6:
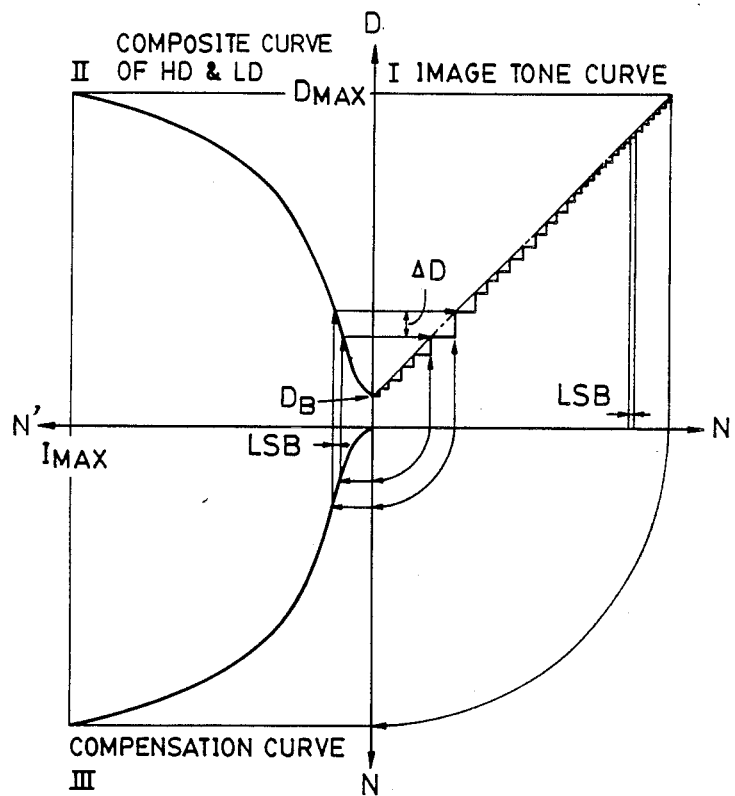

FIG. 6 illustrates diagrams showing recording characteristics according to the present embodiment; FIGS. 6(A) and 6(B) correspond to FIGS. 5(A) and 5(B), respectively. In FIG. 5(A), image data and the driving current of the semiconductor laser are proportional and equivalent to each other, while, in FIG. 6(A), image data N and driving current are equivalent to each other between values corresponding to $I_{MIN}$ and $I_{MAX}$, but are not equivalent at values not more than the value corresponding to $I_{MIN}$ because of pulse-width modulation. The ordinate of the fourth quadrant represents the amount of exposure E. Turned-on time for one picture element is constant between values corresponding to $I_{MIN}$ and $I_{MAX}$, and the relationship between image data and the amount of exposure is identical to the relationship between the driving current and light output of the semiconductor laser and shows a nearly linear characteristic. The relationship between image data and the amount of exposure shows a linear characteristic at values not more than the value corresponding to $I_{MIN}$, as described above. In this case, the ratio of input to output of the look-up table 5 in FIG. 1 is 1:1, and input image data are output as they are. If a gray scale of 0-4095 is stored as image data, the characteristic as shown in the first quadrant can be obtained. The look-up table 5 is usually constituted by a RAM, and its content can be freely rewritten by a microcomputer and the like. As is apparent in comparing FIG. 6 with FIG. 5, the characteristic which can be obtained by the present invention has a less steep slope and no sharp inflection point compared with those of the conventional examples. Consequently, when the characteristic shown in the third quadrant in FIG. 6(B) is written in the look-up table 5 and the characteristic of a recorded image is corrected into a linear characteristic, the difference ΔD in density per 1 LSB is smaller than those of the conventional examples because the slope is less steep, and the number of bits of the look-up table becomes smaller. In addition, no difficulty in correction exists, because there is no sharp inflection point. Furthermore, as shown in FIG. 6(B), once a nonlinear correction is performed, the processing at the stage preceding the nonlinear correction, that is, a characteristic which is equivalent to the characteristic can be obtained in the first quadrant, and it is possible to freely set the characteristic of a recorded image.

In the present embodiment, pulse width modulation is performed at low density portions having densities not more than $D_A$. Hence, the phenomenon that black lines become thin occurs only at very low density areas, and no significant problem arises from the viewpoint of practical use.

Although the pulse-width modulator consisting of components indicated by numerals 14, 15 and 16 in FIG. 1 is illustrated by an analog circuit, the same function may also be provided by reading a memory in which the threshold value has been written at the cycle of one picture element, and comparing the read data with 8-bit image data in a digital comparator. In this case, a clock for reading the memory becomes 256 times the clock of one picture element in the present embodiment. Hence, a very fast clock is required.

Figure 3:
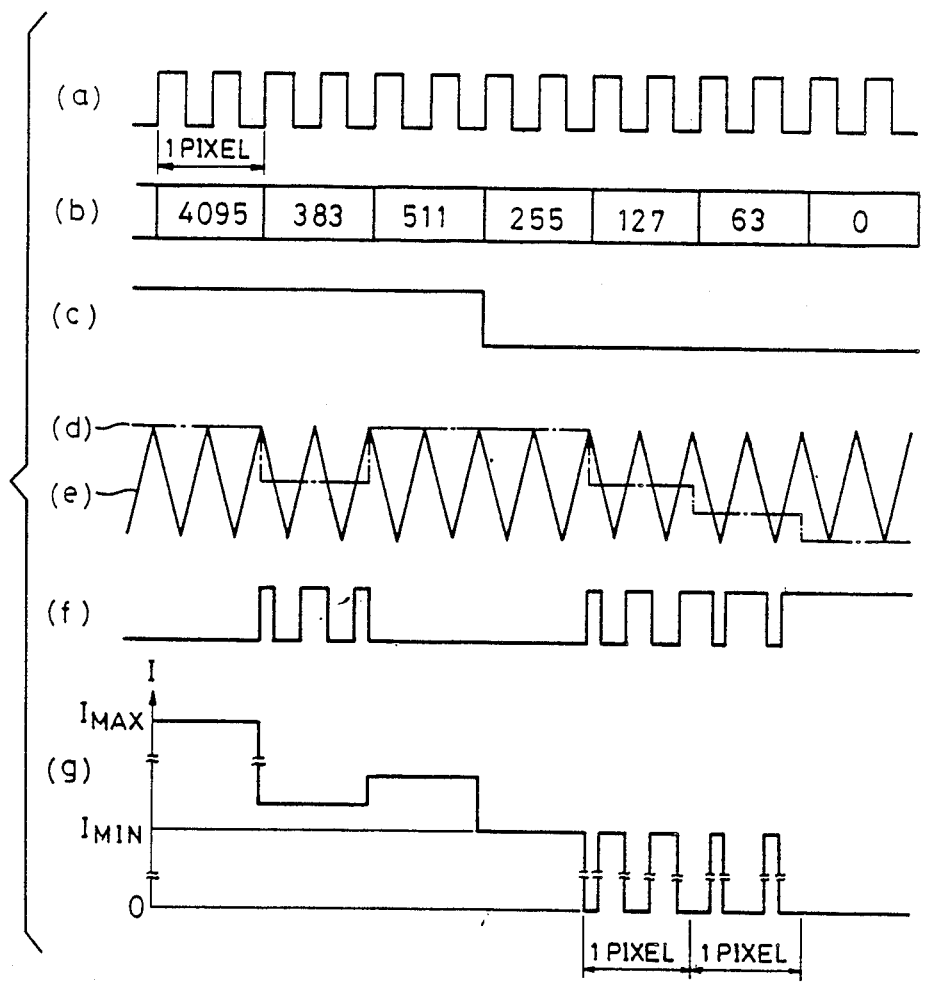
FIG. 3, comprising
Figure 7A:
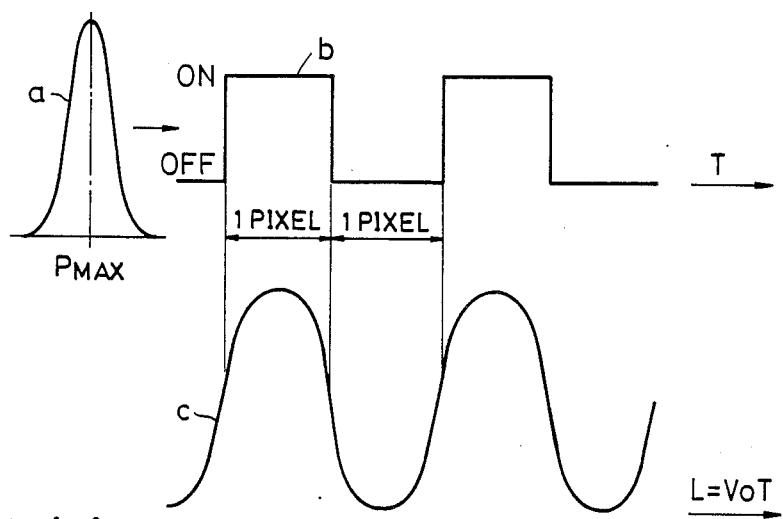
FIG. 7, composed of FIGS. 7(A) through 7(C), shows diagrams of influence due to pulse-width modulation.
Figure 7B:
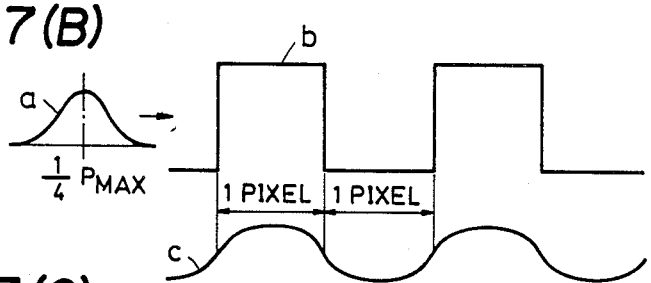
Figure 7C:
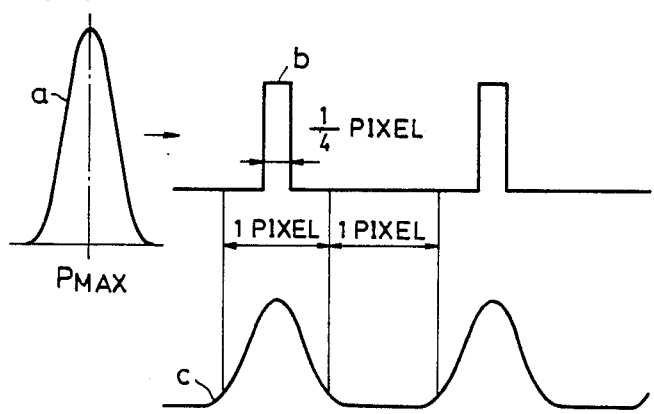
Figure 8:
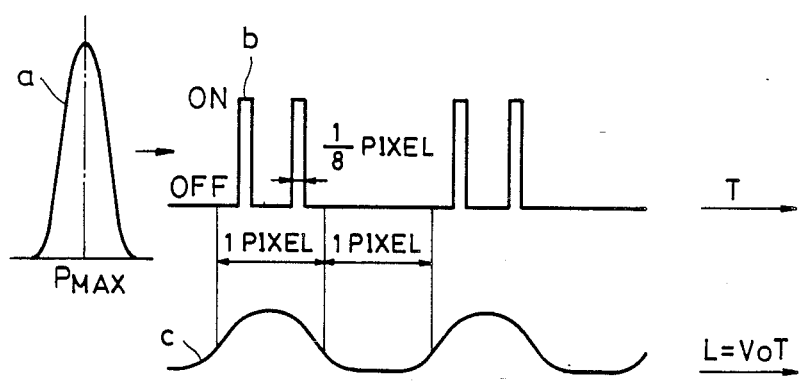
FIG. 8 shows a diagram of improvement in influence due to pulse-width modulation according to the present invention.

FIG. 3 shows another embodiment of the present invention. This is an example in which the frequency of the clock generator 1 in FIG. 1 is set to twice the read frequency of image data, the frequency dividing ratio of the clock divider is set to 2, and pulse width modulation is performed twice within the time interval of one picture element. The signals in FIGS. 3(a)-3(g) correspond to (a)-(g) in FIG. 2, respectively. The distribution of the amount of exposure in this case is shown in FIG. 8. Symbols a-c in FIGS. 8 correspond to symbols a-c in FIG. 7. In this example, turned-on time for one-quarter picture element in FIG. 7(c) is divided into two portions for one-eighth picture element. Although integral of the amount of exposure is equal, it can be understood that the duty ratio of on-portion to off-portion in the distribution of the amount of exposure is improved. In FIG. 8, the light output is shown as $P_{MAX}$ for the purpose of allowing a clear comparison with FIG. 7; it is actually $P_{MIN}$ in the present invention, and the above-described phenomenon appears only at low-contrast portions.

If the frequency of the clock generator 1 and the frequency dividing ratio of the clock divider 2 is further increased, it is possible to perform further more pulse-width modulations within the time interval of one picture element, and make the duty ratio of the distribution of the amount of exposure nearly 1:1. In that case, however, the triangular signal generator 16 and the comparator 15 having high accuracy are required. For practical use, two modulations within the time interval of one picture element as shown in the present embodiment are satisfactory.

Although the above explanation has been provided for the embodiments using a semiconductor laser, the present invention may also be applied to a light source other than a semiconductor laser, provided that it can be directly modulated and has the characteristic that light oscillation is divided into a stable area and an unstable area from a predetermined threshold value, and "laser" is therefore used generically in this sense.

What is claimed is:

1. A laser irradiating apparatus comprising:
   a laser which can be directly modulated by a modulation signal, and in which laser oscillation becomes unstable when the intensity of the modulation signal is smaller than a predetermined threshold value, and laser oscillation becomes stable when the intensity of the modulation signal is larger than the predetermined threshold value:
   means for comparing the intensity of said modulation signal with a predetermined value near said predetermined threshold value; and
   means for modulating an emission time of said laser when the intensity of said modulation signal is smaller than said predetermined value.

2. A laser irradiating apparatus according to claim 1, wherein said laser is a semiconductor laser.

3. A laser irradiating apparatus according to claim 2, wherein said predetermined threshold value is an inflection point from an LED irradiation to a laser oscillation.

4. A recording apparatus comprising:
   a laser which can be directly modulated by a modulation signal, and in which laser oscillation becomes unstable when the intensity of the modulation signal is smaller than a predetermined threshold value, and laser oscillation becomes stable when the intensity of the modulation signal is larger than the predetermined threshold value;
   means for comparing the intensity of said modulation signal with a predetermined value near said predetermined threshold value;
   means for modulating an emission time of said laser when the intensity of said modulation signal is smaller than said predetermined value; and
   means for irradiating said modulated laser light on a recording medium.

5. A laser recording apparatus according to claim 4, wherein said recording medium is a recording sheet, and recording is two-dimensionally performed by relatively moving the laser light and the recording sheet.

6. A laser recording apparatus according to claim 5, wherein said recording medium is a photosensitive silver-salt film.

7. A laser irradiating apparatus comprising:
   a laser which can be directly modulated by a modulation signal, and in which laser oscillation becomes unstable when the intensity of the modulation signal is smaller than a predetermined threshold value, and laser oscillation becomes stable when the intensity of the modulation signal is larger than the predetermined threshold value;
   means for comparing the intensity of said modulation signal with a predetermined value near said predetermined threshold value;
   means for modulating an emission intensity of said laser when the intensity of said modulation signal is larger than said predetermined value; and
   means for modulating an emission time of said laser when the intensity of said modulation signal is smaller than said predetermined value.

8. A laser irradiating apparatus according to claim 7, wherein a nonlinear characteristic of a composite of the laser and a recording medium is corrected into a substantially linear characteristic by referring to a look-up table.

9. A laser irradiating apparatus comprising:
   a laser which can be directly modulated by a modulation signal, and in which laser oscillation becomes unstable when the intensity of the modulation signal is smaller than a predetermined threshold value, and laser oscillation becomes stable when the intensity of the modulation signal is larger than the predetermined threshold value;
   means for comparing the intensity of said modulation signal with a predetermined value near said predetermined threshold value; and
   means for modulating an emission time of said laser so that an area exposed by said laser is broadened with respect to both sides one picture element when said recording signal is smaller than said predetermined value.

10. A laser irradiating apparatus comprising:
    a laser which can be directly modulated by a modulation signal, and in which laser oscillation becomes unstable when the intensity of the modulation signal is smaller than a predetermined threshold value, and laser oscillation becomes stable when the intensity of the modulation signal is larger than the predetermined threshold value;
    means for comparing the intensity of said modulation signal with a predetermined value near said predetermined threshold value;
    means for modulating an emission intensity of said laser when the intensity of said modulation signal is larger than said predetermined value; and
    means for modulating an emission time of said laser so that an area exposed by said laser is broadened with respect to both sides of one picture element, when said recording signal is smaller than said predetermined value.

11. A laser irradiating apparatus according to claim 10, wherein the means for modulating the emission time performs a time modulation by comparing a triangular wave having a period of one picture element with said recording signal.

12. A laser irradiating apparatus comprising:
    a laser which can be directly modulated by a modulation signal, and in which laser oscillation becomes unstable when the intensity of the modulation signal is smaller than a predetermined threshold value, and laser oscillation becomes stable when the intensity of the modulation signal is larger than the predetermined threshold value;

means for comparing the intensity of said modulation signal with a predetermined value near said predetermined threshold value; and means for modulating an emission time of said laser so that said laser operates plural times within a period corresponding to one picture element when said recording signal is smaller than said predetermined value.

13. A laser irradiating apparatus comprising:

a laser which can be directly modulated by a modulation signal, and in which laser oscillation becomes unstable when the intensity of the modulation signal is smaller than a predetermined threshold value, and laser oscillation becomes stable when the intensity of the modulation signal is larger than the predetermined threshold value;

means for comparing the intensity of said modulation signal with a predetermined value near said predetermined threshold value;

means for modulating an emission intensity of said laser when the intensity of said modulation signal is larger than said predetermined value; and means for modulating an emission time of said laser so that said laser operates plural times within a period corresponding to one picture element when said recording signal is smaller than said predetermined value.

14. A laser irradiating apparatus according to claim 13, wherein the means for modulating the emission time performs a time modulation by comparing a triangular wave having a period of an integer multiple of one picture element with said recording signal.

15. A recording apparatus comprising:

a laser which can be directly modulated by a modulation signal, and in which laser oscillation becomes unstable when the intensity of the modulation signal is smaller than a predetermined threshold value, and laser oscillation becomes stable when the intensity of the modulation signal is larger than the predetermined threshold value;

means for comparing the intensity of said modulation signal with a predetermined value near said predetermined threshold value;

means for modulating an emission intensity of said laser when the intensity of said modulation signal is larger than said predetermined value;

means for modulating an emission time of said laser when the intensity of said modulation signal is smaller than said predetermined value;

means for performing a main scanning of said modulated laser light on a recording medium; and means for performing a subscanning of said recording medium in a direction crossing with said mean scanning.

* * * * *

UNITED STATES PATENT AND TRADEMARK OFFICE
CERTIFICATE OF CORRECTION

PATENT NO. : 4,987,426

DATED : January 22, 1991

INVENTOR(S) : Shinichi Ota et al

It is certified that error appears in the above-identified patent and that said Letters Patent is hereby corrected as shown below:

COLUMN 8

Line 31, "characteristic can" should read --characteristic corresponding to the fourth quadrant of FIG. 6(B), can--.

COLUMN 9

Line 30, "value:" should read --value;--.

COLUMN 10

Line 33, "sides one" should read --sides of one--.

COLUMN 11

Line 7, "recording signal" should read --modulation signal--.
    Line 27, "recording signal" should read --modulation signal--.

UNITED STATES PATENT AND TRADEMARK OFFICE
CERTIFICATE OF CORRECTION

PATENT NO. : 4,987,426

DATED : January 22, 1991

INVENTOR(S) : SHINICHI OTA ET AL.

It is certified that error appears in the above-identified patent and that said Letters Patent is hereby corrected as shown below:

COLUMN 12

Line 5, "recording signal" should read --modulation signal--.
Line 26, "mean" should read --main--.

Signed and Sealed this

Third Day of November, 1992

Attest:

DOUGLAS B. COMER

*Attesting Officer*      Acting Commissioner of Patents and Trademarks